(12) United States Patent
Eggleston

(10) Patent No.: US 7,934,905 B2
(45) Date of Patent: May 3, 2011

(54) WIND ENERGY SYSTEM HAVING AN INSECT SENSOR

(75) Inventor: Eric Eggleston, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 11/947,865

(22) Filed: Nov. 30, 2007

(65) Prior Publication Data

US 2009/0140862 A1 Jun. 4, 2009

(51) Int. Cl.
*B64C 11/00* (2006.01)
*B63H 1/00* (2006.01)
*G05D 3/12* (2006.01)
*A01K 15/02* (2006.01)
*A01M 1/20* (2006.01)

(52) U.S. Cl. .............. 416/61; 416/1; 700/286; 119/718; 43/107

(58) Field of Classification Search ........ 290/7; 416/31; 119/718, 719, 730; 700/286
See application file for complete search history.

(56) References Cited

U.S. PATENT DOCUMENTS

| 5,255,468 | A * | 10/1993 | Cheshire, Jr. | 43/113 |
| 6,493,363 | B1 * | 12/2002 | Shuman et al. | 370/539 |
| 6,653,971 | B1 * | 11/2003 | Guice et al. | 342/54 |
| 7,560,823 | B2 * | 7/2009 | Schellings | 290/44 |
| 7,591,099 | B2 * | 9/2009 | Lang et al. | 43/107 |
| 2004/0154213 | A1 * | 8/2004 | Mosher, II | 43/107 |
| 2006/0179708 | A1 * | 8/2006 | Garland | 43/107 |
| 2007/0001461 | A1 * | 1/2007 | Hopewell | 290/44 |
| 2007/0143088 | A1 * | 6/2007 | Garland | 703/11 |
| 2008/0298962 | A1 * | 12/2008 | Sliwa | 416/31 |
| 2009/0175807 | A1 * | 7/2009 | Jones, Jr. | 424/59 |
| 2009/0185900 | A1 * | 7/2009 | Hirakata et al. | 416/1 |

FOREIGN PATENT DOCUMENTS

JP 2006136276 A * 6/2006
WO WO 2007038992 A1 * 4/2007

OTHER PUBLICATIONS

Arnett et al., Patterns of pre-construction bat activity at a proposed wind facility in northwest Massascusetts, Bats and Wind Energy Cooperative, 2007 ( http://www.batsandwind.org).*
Arnett et al. Relationships between Bats and Wind Turbines in Pennsylvania and West Virginia, Bats and Wind Energy Cooperative, Jun. 2005 (http://www.batsandwind.org).*

* cited by examiner

Primary Examiner — Albert DeCady
Assistant Examiner — Darrin Dunn
(74) Attorney, Agent, or Firm — Global Patent Operation; Douglas D. Zhang

(57) ABSTRACT

The invention relates to wind energy systems. A wind energy system is provided having an insect sensor. The insect sensor is adapted for measuring the insect density in the air. Further, a method for operating a wind energy system taking into account the insect density in the air is provided. The wind energy system is curtailed during times with a high insect density. Hence, in periods following times with a high insect density, the wind energy system can be operated without the aero-dynamical performance of the rotor blades being spoiled by smashed insects.

13 Claims, 4 Drawing Sheets

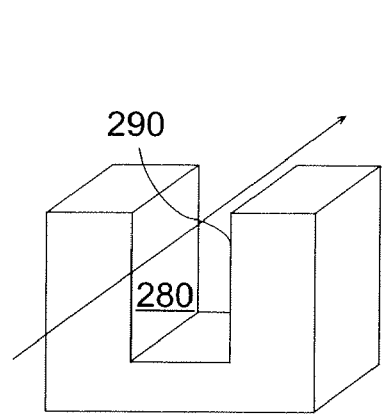
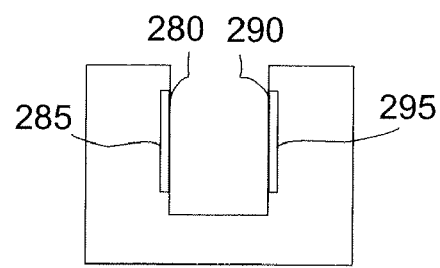
Fig. 2A Fig. 2B
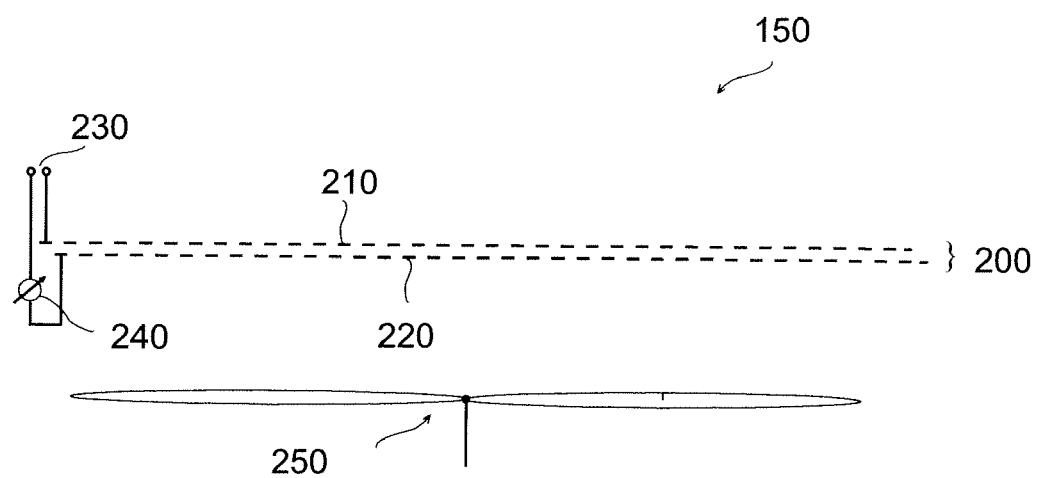
Fig. 3

WIND ENERGY SYSTEM HAVING AN INSECT SENSOR

BACKGROUND OF THE INVENTION

The present invention relates to a wind energy system and the operation thereof. In particular, the present invention relates to a wind energy system with improved sensor equipment. Further, the present invention relates particularly to the operation of a wind energy system with increased overall performance.

In particular in summer with low winds after rain, insects such as bugs often fly into the rotor of a wind energy system and splatter on the leading edge of the wind energy system rotor blades thereby soiling lift and reducing output. In order to recover summer performance it is known in the art to wait for rain that may clean the blades from the insects that got caught by the blades. However, waiting for rain is most inefficient particularly at those wind energy systems sites being located in dry regions.

Hence, it is known in the art to provide a wind energy system with blade washing equipment. For instance, blade washing may be started in the event that performance of the wind energy system drops significantly. However, the blade washing equipment known in the art has several drawbacks. First of all, the equipment of a wind energy system with blade washing equipment is a complex and expensive issue. Further, the provision of blade washing equipment requires a water connection of the blade washing equipment with a water supply.

BRIEF DESCRIPTION OF THE INVENTION

In view of the above, a wind energy system having an insect sensor is provided.

According to a further aspect, a method of operating a wind energy system taking into account the insect density in the air is provided.

According to an aspect, the wind energy system is automatically curtailed during times with a high number of insects in the air.

According to a further aspect, a wind farm having at least two wind energy systems and at least one insect sensor linked to at least one of the at least two wind energy systems is provided.

According to a further aspect, a wind farm having at least one wind energy system according to embodiments described herein and at least one further wind energy system is provided. The at least one further wind energy system is not necessarily equipped with an insect sensor.

According to a further aspect, a computer-readable medium is provided that provides instructions which when executed by a computing platform cause the computing platform to perform operations wherein these operations comprise the method steps according to the method as described herein.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIGS. 2A and 2B are schematic views of an insect sensor for the wind energy system according to embodiments described herein.

FIG. 3 is a schematic view of an insect sensor for the wind energy system according to embodiments described herein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
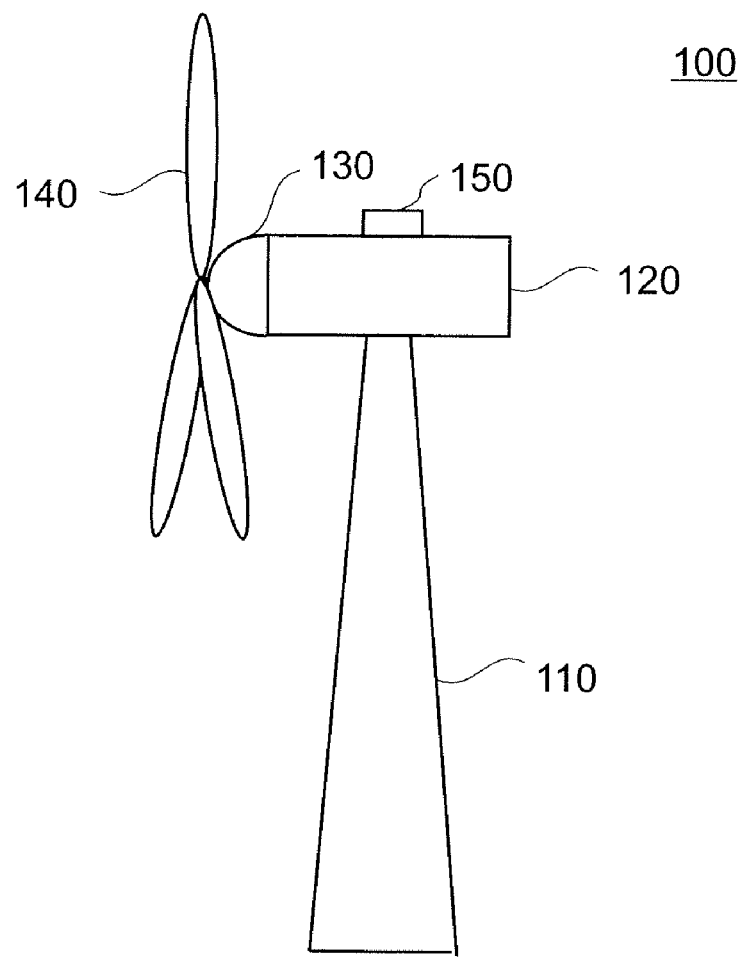
FIG. 1 is a schematic view of a wind energy system according to embodiments described herein.

FIG. 1 is a schematic view of a wind energy system. The wind energy system 100 has a tower 110 to which a machine nacelle 120 is mounted at its top end. The nacelle houses a drive train to which an electric generator is connected (not shown). The hub 130 bearing three rotor blades 140 is mounted to a lateral end of the machine nacelle 120. The rotor blades 140 can be adjusted by pitch drives which are typically accommodated inside hub 130. FIG. 1 is for illustrative purposes only. Embodiments described herein comprise also one-, two-, or more bladed wind energy system. Further, they comprise also vertical axis turbine configurations.

FIG. 1 shows further the insect sensor 150 positioned on the top of the nacelle 120. This is for exemplary purposes only. The insect sensor may also be placed at other positions on or close to the wind energy system according to embodiments described herein. In particular, the insect sensor may be placed at the tower, on the nacelle, on the hub, on the foundation of the wind energy system, or the like.

Further, the insect sensor may also be placed outside a wind energy system. It is typically linked to one or more wind energy systems to transmit signals on the measured insect density. Typically, at least one insect sensor is provided per wind farm. Typically, the at least one insect sensor is linked to every wind energy system of the wind farm. The term "wind farm" refers to a multitude of wind energy systems.

According to typically embodiments described herein, the insect sensor is positioned on the rotor blade, typically on the outboard portion of a wind energy system rotor blade, even more typically at or close to the rotor blade tip. The "outboard portion" is understood as within the outer 50% of the rotor blade's length. "Close to" in this context is to be understood as within the outermost 20%, more typically 10% of the rotor blade's length. For instance, the insect sensor could be an optical insect sensor (see below for more details). Typically, the insect sensor is protected under a fairing, a housing or the like. Hence, the insect sensor measures the insect density in an identical manner as the rotor blades are confronted with the insects. An additional fan is typically not necessary in these embodiments since an appropriate air stream for the sensor is already present due to the rotational speed of the insect sensor mounted on the blade.

According to some embodiments where a wind energy system with an insect sensor mounted to a blade is operated within a wind park it may be sufficient that this wind energy system gives information on the insect density to the other wind energy systems in order to survey and/or initiate curtailing of these wind energy systems. According to some embodiments, the other wind energy systems are not provided with an insect sensor. The wind energy system having the insect sensor mounted to the blade is, according to some embodiments, not curtailed in the event of a high insect density. This is in order to have reliable information on the insect density which may—in the embodiments described—be dependent on the rotation of the rotor blades and thus also on the mounted insect sensor.

According to embodiments described herein, the insect sensor shall provide the operation control of the wind energy system with information on the insect density in the air. The insect sensor is adapted for measuring the number of insects per cubic meter. The number of insects per cubic meter is called "insect density" herein. In addition, the insect sensor may also measure the mass of the insects per cubic meter.

Typically, the insect sensor measures only those insects whose size and/or weight is above a certain threshold value. According to other typical embodiments described herein, all insects independent on their size and/or weight are measured. Typically, the average size and/or weight is measured.

According to typical embodiments described herein, the insect sensor is adapted for measuring the number of insects caught by the insect sensor per time. Typically, only flying insects are counted.

FIG. 2A shows a schematic perspective view of an exemplary embodiment of the insect sensor as described herein. The insect sensor is provided with optical means for measuring the insect density. This shall be named "optical insect sensor" herein. Optical means typically comprise a radiation emitter and a radiation detector. Examples are given below. The insect sensor may have a U-shape providing an open air region for insects to fly through. The arrow depicted in FIG. 2A shows exemplarily the flight direction of an insect that is measured by the insect sensor.

According to typical embodiments, the insect sensor comprises a radiation emitting side 280 and a radiation receiving side 290. Typically, the radiation emitted is visible light (i.e. between 400 nm and 800 nm wavelength), infrared, ultraviolet or the like.

FIG. 2B is a cross-sectional view of the insect sensor depicted in FIG. 2A. As it is shown in more detail in FIG. 2B, the radiation emitting side 280 is provided with a radiation emitter 285. For instance, a radiation emitter can be diodes, in particular LEDs (light emitting diodes), lasers, or the like. Typically, the radiation receiving side 290 of the insect sensor is provided with a radiation detector 295. For instance, a radiation emitter can be diodes, CCD (charged coupled device) photo sensors or the like. The radiation detector is adapted for measuring shadowing effects due to insects flying through the emitted light. Typically, the radiation detector is coupled to an electronics assembly (not shown) for evaluating the measurement results. It is possible to arrange a photomultiplier (not shown) at the radiation detector in order to multiply the measured signal.

Hence, according to embodiments described herein, the insect sensor is adapted for measuring the insect density optically. Typically, insects flow through a light band, induced by light diodes, and lead to shadowing effects on the receiving side. According to some embodiments described herein, the sent radiation is pulse-modulated so that outside light effects cannot falsify the measurement results.

The insect sensor may be equipped with a protection against rain such as a horizontally arranged housing in order to distinguish rain from insects. According to some embodiments, in particular according to those embodiments wherein the insect sensor is mounted to a rotor blade, the wind energy system is additionally equipped with a rain sensor in order to separate rain from insect signals. Accordingly, the method according to embodiments described herein comprises measuring the rain and taking into account the rain signal when determining the insect density.

FIG. 3 shows a schematic view of another exemplary embodiment of the insect sensor as described herein. The insect sensor as shown in FIG. 3 comprises a grid unit 200. The grid unit 200 typically comprises a first grid 210 and a second grid 220. According to typical embodiments, the first grid 210 and the second grid 220 are connected to a power source 230. The grids 210 and 220 are not directly connected to each other. The first grid 210 is connected to a first terminal of the power source 230 whereas the second grid 220 is connected to a second terminal of the power source 230. According to some embodiments described herein a current sensor 240 is provided. The current sensor is typically placed between power source and one of the first and second grids.

Further, according to some embodiments described herein, means for generating an air stream are provided. Such means are exemplary shown in FIG. 3 by the fan 250. Typically, the fan is adapted for providing an air stream with a speed that is higher than most insects can fly. Typically, the fan is adapted for providing an air stream with a speed of at least 15 m/s, more typically of at least 20 m/s, even more typically of at least 25 m/s.

A fan as described exemplarily with respect to the embodiment of FIG. 3 can also be applied with an optical insect sensor as exemplarily described with respect to FIGS. 2A and 2B. Typically, the fan is arranged such that the generated air stream sucks the insects through the open-air region of the optical insect sensor. According to other embodiments, the air stream generated is directed towards the open-air region of the insect sensor that is provided for the insects to fly through. As it is shown in the exemplary embodiment shown in FIG. 2A, the air stream direction typically coincides with the arrow depicted in FIG. 2A.

The insect sensor as described herein is adapted for measuring the insect density in the air. In operation, the two grids are electrified with different voltages. The applied voltage may be AC or DC. The distance of the grids is such that there is no contact between the grids under normal conditions. In the event that an insect that is equal to or larger than the mesh opening of the grids flies into the grid, it represents a short-circuit between the two grids. Typically, the insect is thereby killed and—due to the current through its body—reduced to such a size and/or such a conductivity that it does no longer form a contact between the grids. Typically, the grids are arranged vertically so that insects caught may fall off the grid after being zapped. Hence, the short-circuit is opened again.

In order to measure the fact that an insect has been caught by the grids, it is possible to measure the varying load on the power source. Alternatively or in addition, it is possible to provide a separate current sensor. Typically, the current sensor is provided between the grids and the power source. For instance, once a bug flies into the grids, a short-circuit between the grids is formed and a current flows for a short time. This current flow is interpreted in that an insect has been caught by the grid. Typically, a short high amplitude in the current sensor refers to one count of an insect. In more elaborate sensors, the height and/or the length of the current flow may also be considered which may allow conclusions on the number and/or size of the caught insects.

Hence, according to typical embodiments of the present invention, the insect sensor comprises an insect-zapping electrifiable grid and a fan to pull air through it at high velocity. In effect, the sensor is a "black hole" for insects that they cannot escape. The sensor typically counts the number of insects such as bugs over a specified time. According to typical embodiments, the sensor is adapted for simulating the environment of the outboard portion of the rotor blades of the wind energy system having a relative velocity of 10 m/s, 15 m/s, 20 m/s, or larger with respect to insect impact and counting.

Typically, the measured insect density is compared with a threshold value. This can be done, for instance, by the wind energy control. Once the density exceeds a predetermined threshold value, curtailing of the wind energy system is started and maintained as long as the measured insect density remains above this threshold value. Once the measured insect density drops again and under-runs this threshold value, the wind energy control initiates standard operation of the wind energy system again. According to typical embodiments described herein, curtailing the wind energy system is to be understood as stopping energy generation. Typically, stopping energy generation comprises operating the wind energy system in an idling mode. According to other embodiments, the rotor is blocked when energy generation is stopped. According to some embodiments, curtailing the wind energy system is understood as reducing the rotational speed of the rotor.

As insects such as bugs typically cannot escape the blade tips moving at velocities of more than about 11-15 m/s, curtailing of the wind energy system is initiated in the event of a high insect density and rotor blade tip velocities of greater than 15 m/s, more typically of greater than 11 m/s.

According to typical embodiments, the wind energy control does not immediately react to the insect sensor signal but calculates a medium value of the measured insect sensor value. Such an averaging is typically undertaken for up to 1 minute, more typically up to 5 minutes or even more typically up to 10 minutes. Hence, according to typical embodiments described herein, once the average value of measured insect density exceeds a predetermined value, the wind energy system control initiates curtailing of the wind energy system.

According to other embodiments, the measured insect density or its average value is compared with a multitude of predetermined threshold values. Each threshold value represents a different level to which the wind energy system has to be curtailed. For instance, exceeding a smaller first threshold value could cause the wind energy control to reduce the rotational speed to a first maximum rotational speed whereas exceeding a higher second threshold value could cause the wind energy control to reduce the rotational speed of the rotor to a second maximum rotational speed. Typically, the second rotational speed is smaller than the first rotational speed. More generally, in the event that a multitude of predetermined threshold values are provided for comparing the insect sensor or averaged insect sensor signal with, the relation between the threshold values to the respective maximum rotational speed of the rotor is indirectly proportional. According to one embodiment, the multitude of threshold values forms a continuous function. That is, according to this embodiment, the wind energy system is operated on base of a predetermined function of the reduction of the power generation in dependence on the insect density. The higher the insect density, the more the power generation of the wind energy system is reduced.

Figure 4:
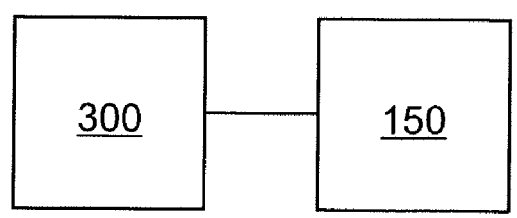
FIG. 4 is a schematic view of parts of the wind energy system according to embodiments described herein.

As it is exemplarily shown with respect to the embodiment depicted in FIG. 4, the insect sensor 150 is connected to the wind energy system control 300. Typically, the wind energy system control can be understood as one or several units of the wind energy system that completely or partly control(s) the operation of the wind energy system. The connection may be directly as it is shown in FIG. 4 or via other parts of the wind energy system. Once a large number of insects in the air is measured, the wind energy control curtails the wind energy system.

According to further embodiments, the wind energy system can be curtailed manually. The insect sensor is typically connected to an output such as a screen, a printer or the like for outputting the measured insect density. On base of the measurement results, an operator of the wind energy system can decide whether the wind energy system should be curtailed.

Hence, according to embodiments of the method of operating a wind energy system as described herein, the wind energy generation is again started when the insect sensor signalizes a decreasing number of insects in the air. Thus, although the wind energy is not completely exploited in times of high insect density, the overall wind energy power generation can be increased in comparison to wind energy systems and methods of operating thereof as known in the art. This is particularly due to the fact that the rotor blades are preserved from a large insect impact so that their aero-dynamical shape is maintained which will lead to a full exploitation of the wind energy during times with low insect density.

Depending on the site of installation, operation of a wind energy system according to embodiments described herein can increase the overall efficiency of the wind energy system typically up to about 5% during summer months. In particular stall controlled wind energy system designs can benefit from the embodiments described herein by an increase of the overall efficiency of up to 40-50%. In addition, the reduced impairment of the rotor blades and their aero-dynamical capability increases the warranty period which will lead to a shifting up of the warranty power curve of the wind energy systems. This, in turn, is of course advantageous for the operator of the wind energy system.

As insects such as bugs do not fly at high wind speeds, the overall loss of energy generation due to the curtailing during times with a high insect density is more than counterbalanced due to the better performance of the wind energy system in times of high wind speed afterwards.

According to typical embodiments as described herein, the wind energy system is equipped with a control software. The control software may comprise those method steps as described herein. In particular, the control software comprises instructions to curtail the wind energy system in the event of a signal from the insect sensor that indicates a high number of insects in the air.

According to embodiments described herein, one or more weather and/or climate information is additionally measured. Those weather and/or climate information comprise the wind speed, the temperature, the precipitation, the time of day, the air pressure, and/or the humidity.

As insects such as bugs typically do not fly at high wind speeds, a low wind speed can be used as further indicator for the presence of a large number of insects. For instance, according to typical embodiments described herein, the insect sensor is only operated at wind speeds below a certain threshold value such as a value up to 10 m/s wind speed, more typically about 6 m/s. Typically, the wind speed is measured for the operation of the wind energy system anyway. In the event that the wind speed under-runs the predetermined threshold value, the insect sensor may be operated. At wind speeds higher than the predetermined threshold value, according to embodiments, the operation of the insect sensor is paused.

According to typical embodiments, the precipitation is measured. A high precipitation cleans the rotor blades. That is, according to some embodiments, the wind energy system is operated at a high precipitation irrespective of the measured insect density. Further, the method according to embodiments described herein may make use of the measured precipitation over time because high precipitation increases the likelihood of a high insect density after the rain. For instance, it is possible to pause operating the insect sensor at a precipitation value that is high. It is also possible to store the measured precipitation values for a later read-out.

According to typical embodiments described herein, the temperature is measured. This is typically done by a thermometer which is, in many embodiments, installed at the wind energy system anyway. According to method embodiments described herein, once the temperature under-runs a predetermined threshold value such as 0° C., the insect sensor is no longer operated since insects do normally not fly at winter time temperatures.

According to typical embodiments described herein, the day of time is measured e.g. by a clock and considered in the operation of the wind energy system. For instance, during evening times the likelihood of a high insect density is particularly high. Hence, in these times, the insect density may be measured although other environmental conditions such as the humidity, wind speed or precipitation militate against a high insect density.

According to typical embodiments described herein, the pressure is measured. Typically, low pressures indicate storms which may indicate coming rain and predict insect blooms or changes in insect behavior. Hence, according to some embodiments, the insect sensor is operated at and/or following the measurement of low pressure. For instance, the operation of the insect sensor could be paused in the event of high pressure or in the event of low humidity along with high pressure.

According to typical embodiments described herein, the humidity is measured. This is typically done by a hygrometer. A high humidity is an indicator for high insect density. Hence, according to embodiments described herein, the insect sensor is operated particularly at a high humidity.

Figure 5:
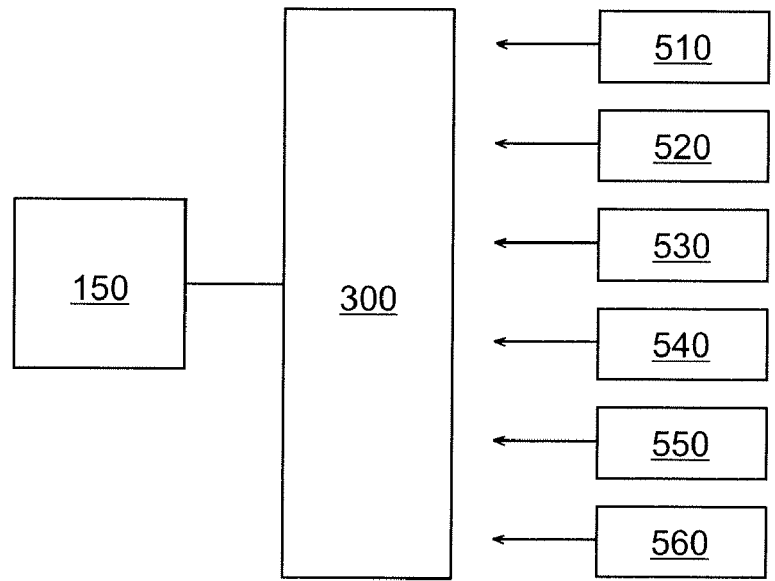
FIG. 5 is an illustrative view of sensors and their connections that the wind energy system according to embodiments described herein might have.

In addition to the insect sensor 150, FIG. 5 shows exemplarily a wind speed sensor 510, a temperature sensor 520, precipitation sensor 530, a clock 540, a pressure sensor 550, and a humidity sensor 560. One or more of these sensors may be part of the wind energy system according to embodiments described herein. According to more particular embodiments, one or more of these sensors may be linked to the operational control of the wind energy system. This is indicated by the arrows leading towards the operational control 300. The distance between the arrows and the operational control 300 shall emphasize that it is not mandatory according to the present invention that one or more of these sensors are provided and/or linked to the operational control 300.

According to embodiments described herein, the wind turbine is automatically curtailed in low winds to omit insect soil and performance reduction particularly during the summer months by measuring the insect density and one or more other weather and/or climate conditions. These weather and/or climate conditions comprise elements of the group consisting of wind speed, temperature, precipitation, time of day, pressure, and humidity. Typically, the weather and/or climate conditions are measured by weather and/or climate condition sensors such as a temperature sensor, a precipitation sensor, a clock, a pressure sensor, and a humidity sensor.

Since bats follow in particular bug blooms, a reduction in bat kills is also expected when providing the wind energy system as described herein or its method of operation.

According to another aspect, a wind farm is provided having at least two wind energy systems and at least one insect sensor. Typically, the at least one insect sensor is connected to all wind energy systems of the wind farm. The insect sensor may be mounted on one of the wind energy systems. However, it is also possible that the insect sensor is separately provided and linked to the wind energy systems in order to transmit information on the insect density.

According to another aspect, a wind farm is provided with at least two wind energy systems. At least one of these at least two wind energy systems is equipped with an insect sensor as described herein. In other words, at least one of these at least two wind energy systems is a wind energy system as described herein.

Figure 6:
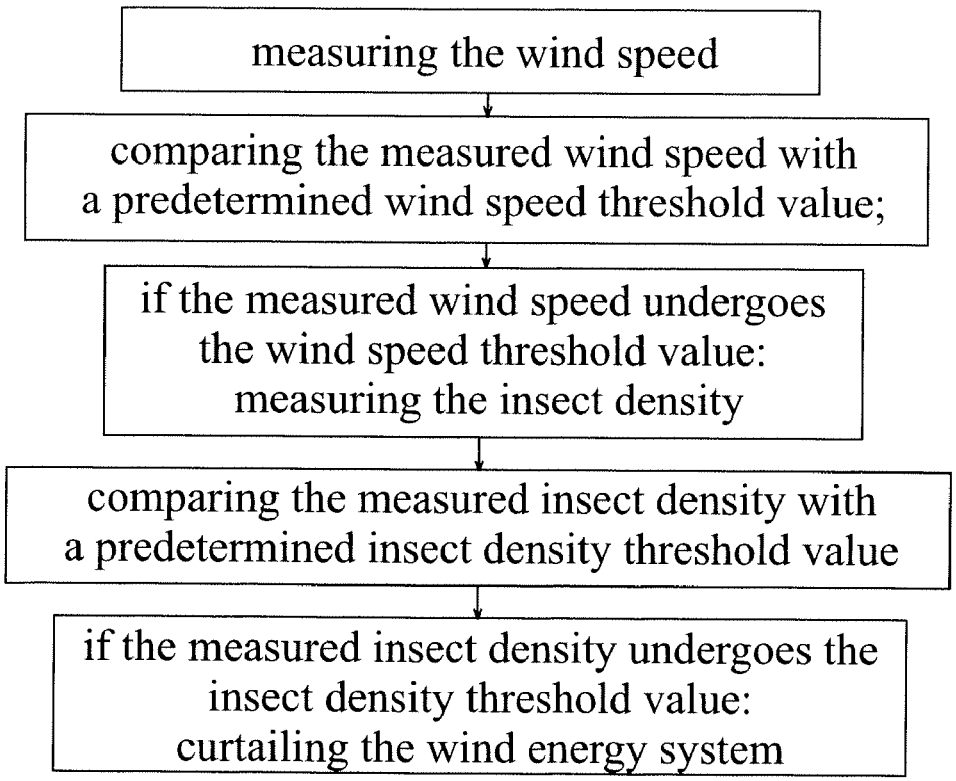
FIG. 6 is a diagram showing the method of operating a wind energy system according to embodiments described herein.

FIG. 6 shows a diagram on a method of operating a wind energy system according to embodiments described herein. The method comprises measuring the wind speed; comparing the measured wind speed with a predetermined wind speed threshold value; measuring the insect density if the measured wind speed undergoes the wind speed threshold value; comparing the measured insect density with a predetermined insect density threshold value; and curtailing the wind energy system if the measured insect density undergoes the insect density threshold value.

Typically, some steps, e.g. measuring the wind speed and comparing the wind speed with a predetermined threshold value, are undertaken constantly. Typically, curtailing the wind energy system is understood as stopping energy generation.

Figure 7:
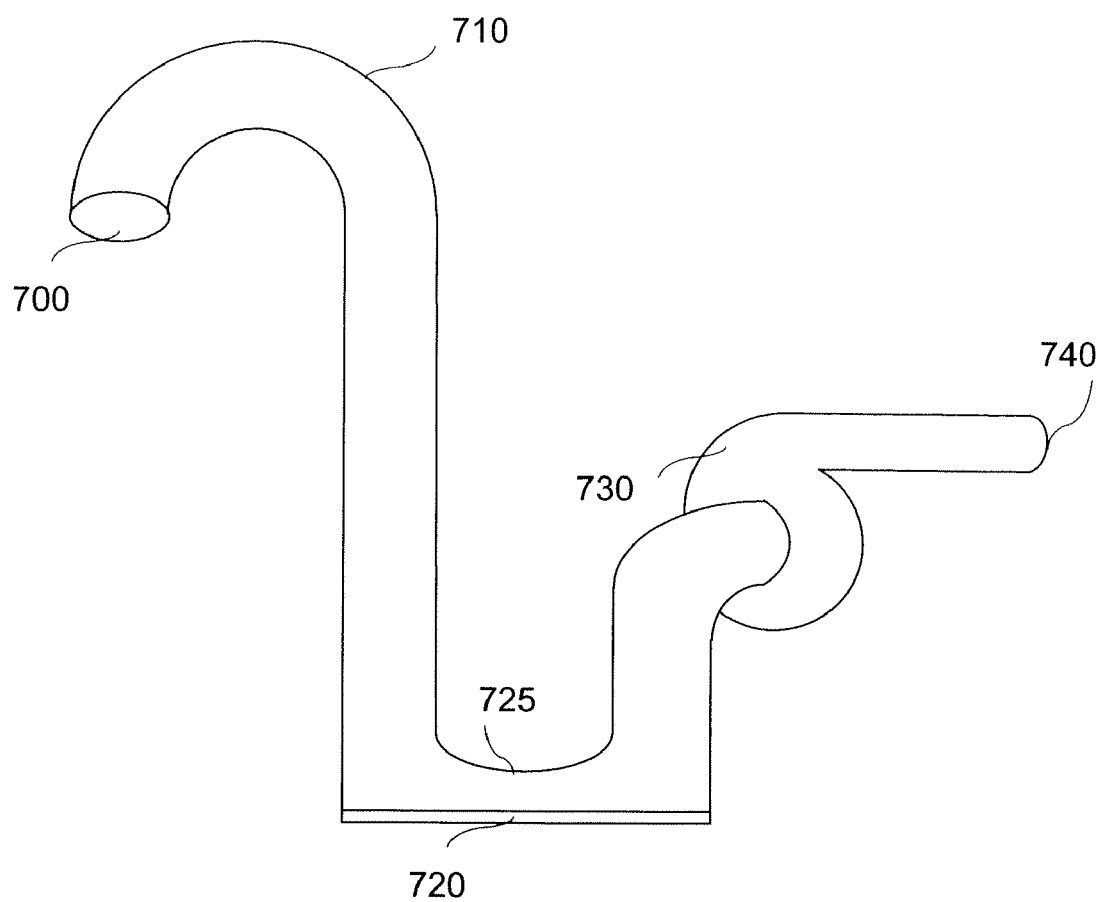
FIG. 7 is a schematic view of an insect sensor for the wind energy system according to embodiments described herein.

FIG. 7 shows another embodiment of an insect sensor according to embodiments described herein. The insect sensor comprises an inlet 700, a bending section 710, a touch sensor 720, a bend 725, a blower 730, and an outlet 740. According to typical embodiments of the insect sensor, the blower generates an airstream within the insect sensor that moves from the insect sensor inlet 700 and exits the insect sensor at the outlet 740. The insects such as bugs are trapped and are moved along with the air stream.

Typically, a bend 725 is part of the insect sensor. The bend acts as a spin filter. A touch sensor is typically positioned in the bend, more typically at the outer side of the bend. Hence, in operation, the air stream changes its streaming direction at the bend with most of the insects, in particular the heavier insects such as bugs, having a momentum that is too large for following the air stream. Therefore, the insects bump into the touch sensor. According to typical embodiments, the touch sensor counts the number of contacts and/or the weight of the impinging insects.

Hence, according to typical embodiments, the insect sensor comprises a touch sensor. The insect sensor may comprise a bend for changing the direction of an air stream. The insect sensor may also comprise a blower for generating an air stream.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A wind energy system comprising:
   an insect sensor configured to measure an insect density in the air adjacent the wind energy system, the insect sensor comprising;
      a tube comprising an inlet end, an outlet end, and a bend disposed between the inlet end and the outlet end;
      a blower configured to generate an airstream within the tube; and
      a touch sensor disposed in the tube,
      wherein the bend comprising an outer side that faces the airstream when the airstream enters the bend, the touch sensor being disposed at the outer side of the bend; and
   an operation control operatively connected to the insect sensor,
      wherein the operation control is operable to curtail a power generation of the wind energy system in response to a signal from the insect sensor.

2. The wind energy system of claim 1, wherein the blower is configured to generate an air flow having a velocity of air at least 15 m/s.

3. The wind energy system of claim 2, wherein the blower is configured to generate an air flow having a velocity of at least 20 m/s.

4. The wind energy system of claim 2, wherein the blower is configured to generate an air flow having a velocity of at least 25 m/s.

5. The wind energy system of claim 1, wherein the operation control is operatively connected to at least one of a wind speed sensor, a temperature sensor, a precipitation sensor, a clock, a pressure sensor and a humidity sensor.

6. A method of operating a wind energy system, the method comprising:
   measuring a wind speed adjacent the wind energy system;
   comparing the measured wind speed with a predetermined wind speed threshold value;
   using an insect sensor to measure an insect density in the air adjacent the wind energy system if the measured wind speed undergoes the predetermined wind speed threshold value, wherein the insect sensor comprises a tube comprising an inlet end, an outlet end, and a bend disposed between the inlet end and the outlet end; a blower configured to generate an airstream within the tube; and a touch sensor disposed in the tube, wherein the bend comprising an outer side that faces the airstream when the airstream enters the bend, the touch sensor being disposed at the outer side of the bend;
   comparing the measured insect density with a predetermined insect density threshold value; and
   curtailing the wind energy system if the measured insect density exceeds the predetermined insect density threshold value.

7. The method of claim 6, wherein at least one of a temperature adjacent the wind energy system, a precipitation adjacent the wind energy system, day of time, an air pressure adjacent the wind energy system, and a humidity adjacent the wind energy system is taken into account in the curtailing step.

8. The method of claim 6, wherein the predetermined wind speed threshold value is 6 m/s.

9. The method of claim 6, wherein the predetermined wind speed threshold value is 10 m/s.

10. The wind energy system of claim 6, wherein the blower is attached to the outlet end of the tube.

11. The wind energy system of claim 6, further comprising an operation control operatively connected to the insect sensor, the operational control curtailing a power generation of the wind energy system in response to a signal from the insect sensor.

12. The wind energy system of claim 11, wherein the operation control is operatively connected to at least one of a wind speed sensor, a temperature sensor, a precipitation sensor, a clock, a pressure sensor and a humidity sensor.

13. The wind energy system of claim 6, wherein the tube further comprises a bending section so that a falling object does not fall into the tube from the inlet end.

\* \* \* \* \*